J. S. BROOKS.
Water Cooler.
No. 39,271.
Patented July 21, 1863.
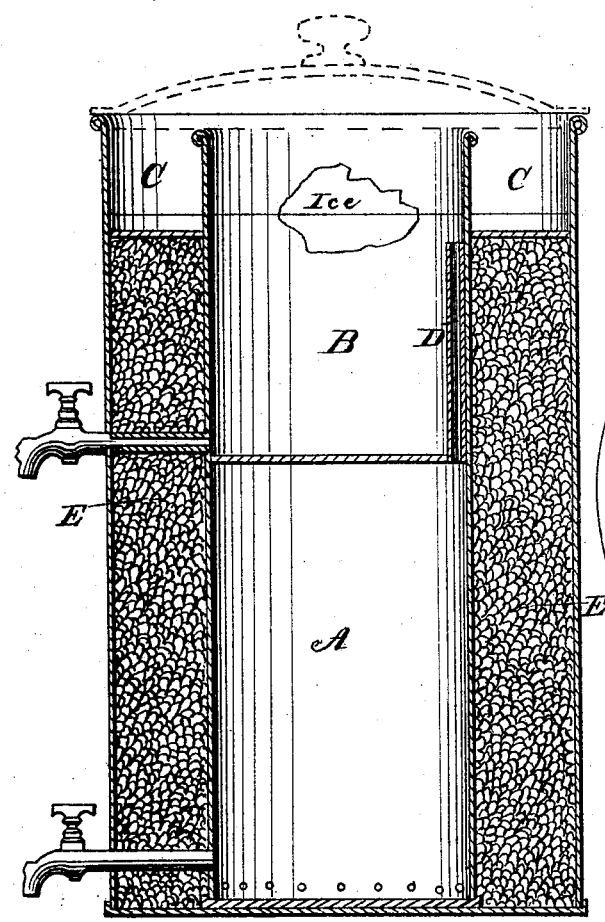
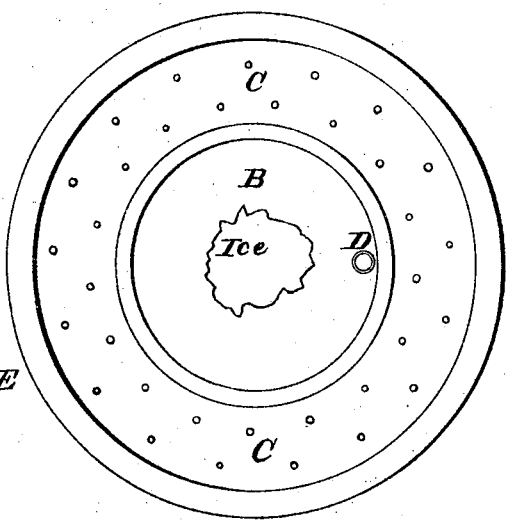
Witnesses:
Inventor:
J. S. Brooks.

UNITED STATES PATENT OFFICE.

JOHN S. BROOKS, OF ROCHESTER, NEW YORK.

IMPROVEMENT IN FILTERS AND COOLERS.

Specification forming part of Letters Patent No. 39,271, dated July 21, 1863.

*To all whom it may concern:*

Be it known that I, JOHN S. BROOKS, of the city of Rochester, county of Monroe, and State of New York, have invented a new and Improved Filter and Cooler Combined; and I do hereby declare the following to be a full and exact description of the same, reference being had to the accompanying drawings, and letters of reference marked thereon.

Figure 1 is a sectional elevation. Fig. 2 is a top view.

Like letters designate similar parts in both the figures.

The nature of my invention consists in constructing a combined filter and cooler with two separate reservoirs for the filtered water, one of which may be used for cooking purposes and for a reserve supply for the other reservoir, which is intended for drinking-water, and is made separate from the other to contain ice-water only. The body may be constructed of oak or other suitable wood, or when metal is used zinc is preferable. In the center of the body, and extending nearly from top to bottom, are the reservoirs A and B, for receiving the filtered water, which, after passing through the filtering media E, enters the reservoir A through the side opening near the bottom, or the packing may extend under the bottom of it, in which case it should be perforated in the bottom for the admission of the water. The supply-reservoir C is formed by the space above the packing and between the reservoir of water and the body. The depth should be proportionate to the size of the filter, and at its bottom, immediately above the packing, may have the perforated plate C, Fig. 2, or a layer of coarse gravel to prevent the displacement of the charcoal and other filtering agents.

The water after percolating through the packing rises to its own level in the reservoirs, first filling the lower one, then flowing up through the pipe D into the upper reservoir. The pipe D also prevents the drainage of the upper reservoir when water is being drawn from the lower one, and also serves to admit air or water for vent to the lower reservoir. The pipe D should be carried to the height to which it is desirable to retain the supply of ice-water, and will, with proper care in filling the supply-chamber, maintain a uniform quantity of water, and this will also tend to equalize the temperature of the drinking-water. The water is drawn from either reservoir by a faucet near the bottom of each. The result is that at a trifling additional cost of construction over the filters or filters and coolers in use, which either supply no ice-water or all ice-water, mine will furnish either or both at the same time, though but one supply chamber is used, and no more trouble or care required than would be necessary to attend to either one singly.

What I claim as my invention, and desire to secure by Letters Patent, is—

1. A combined filter and cooler, having two separate reservoirs for the filtered water, substantially as shown, and for the purposes specified.

2. In combination with the two reservoirs, the pipe D, serving as a supply to the upper reservoir and as a passage for air to and from the lower reservoir, as and for the purposes shown and specified.

JOHN S. BROOKS.

Witnesses:
WM. S. LOUGHBOROUGH,
W. A. LODER.